(12) United States Patent  
Walker et al.

(10) Patent No.: US 7,245,795 B2  
(45) Date of Patent: Jul. 17, 2007

(54) OPTICAL DEVICE INCORPORATING A TILTED BRAGG GRATING

(75) Inventors: Robert Walker, Spencerville (CA); Stephen J. Mihailov, Kanata (CA); Ping Lu, Ottawa (CA); Dan Grobnic, Ottawa (CA); Xiaoli Dai, Ottawa (CA); Huimin Ding, Nepean (CA); George Henderson, Ottawa (CA); Christopher Smelser, Ottawa (CA)

(73) Assignee: Her Majesty the Queen in Right of Canada as represented by the Minister of Industry, through the Communications Research Centre Canada, Ottawa, Ontario (CA)

( * ) Notice: Subject to any disclaimer, the term of this patent is extended or adjusted under 35 U.S.C. 154(b) by 0 days.

(21) Appl. No.: 11/272,871

(22) Filed: Nov. 15, 2005

(65) Prior Publication Data

US 2007/0110367 A1    May 17, 2007

Related U.S. Application Data

(60) Provisional application No. 60/626,864, filed on Nov. 12, 2004.

(51) Int. Cl.
*G02B 6/12* (2006.01)
(52) U.S. Cl. ............................ 385/14; 385/37
(58) Field of Classification Search ............... 385/14, 385/37
See application file for complete search history.

(56) References Cited

U.S. PATENT DOCUMENTS

| | | | |
|---|---|---|---|
| 4,295,738 A | 10/1981 | Meltz et al. | |
| 4,295,739 A | 10/1981 | Meltz et al. | |
| 4,335,933 A * | 6/1982 | Palmer | 385/36 |
| 5,007,705 A | 4/1991 | Morey et al. | |
| 5,042,897 A | 8/1991 | Meltz et al. | |
| 5,061,032 A | 10/1991 | Meltz et al. | |
| 5,367,589 A | 11/1994 | MacDonald et al. | |
| 5,384,884 A | 1/1995 | Kashyap et al. | |
| 5,469,520 A | 11/1995 | Morey et al. | |
| 5,666,197 A * | 9/1997 | Guerra | 356/512 |
| 5,671,307 A | 9/1997 | Lauzon et al. | |
| 5,796,487 A * | 8/1998 | Guerra | 356/613 |
| 5,832,156 A * | 11/1998 | Strasser et al. | 385/48 |
| 5,850,302 A | 12/1998 | Strasser et al. | |

(Continued)

OTHER PUBLICATIONS

Westbrook et al, "In-Line Polarimeter Using Blazed Fiber Gratings", IEEE Photon. Technol. Lett. 12, pp. 1352-1354, 2000.

(Continued)

*Primary Examiner*—Ellen E. Kim
(74) *Attorney, Agent, or Firm*—Teitelbaum & MacLean; Neil Teitelbaum; Doug MacLean

(57) ABSTRACT

The invention relates to an optical waveguide device for monitoring a characteristics of light, e.g. a wavelength. The device incorporates a waveguide, such as an optical fiber, with an embedded tilted Bragg grating operating in a regime of wavelength detuning. The grating is designed to disperse light azimuthally in two or more different directions about the fiber axis, said directions changing with wavelength. A photodetector array is provided for detecting the azimuthal distribution of light. A processor coupled to the photodetector array determines wavelength information from the detected azimuthal distribution of the out-coupled light.

19 Claims, 10 Drawing Sheets

U.S. PATENT DOCUMENTS

| | | | |
|---|---|---|---|
| 5,982,962 A * | 11/1999 | Koops et al. | 385/37 |
| 5,987,200 A | 11/1999 | Fleming et al. | |
| 6,002,822 A | 12/1999 | Strasser et al. | |
| 6,122,422 A | 9/2000 | Koeppen et al. | |
| 6,211,957 B1 | 4/2001 | Erdogan et al. | |
| 6,304,696 B1 | 10/2001 | Patterson et al. | |
| 6,529,676 B2 | 3/2003 | Eggleton et al. | |
| 6,591,024 B2 | 7/2003 | Westbrook | |
| 6,597,839 B2 | 7/2003 | Mihailov et al. | |
| 6,611,645 B2 * | 8/2003 | Aleksoff | 385/48 |
| 6,768,824 B2 | 7/2004 | Ramachandran | |
| 6,795,620 B2 * | 9/2004 | Tavlykaev et al. | 385/48 |
| 6,816,260 B2 | 11/2004 | Peupelmann et al. | |
| 6,865,320 B1 * | 3/2005 | Westbrook | 385/37 |
| 6,885,792 B2 | 4/2005 | Eggleton et al. | |
| 6,959,153 B2 * | 10/2005 | Vohra | 398/83 |

OTHER PUBLICATIONS

Li et al, "Volume Current Method for Analysis of Tilted Fiber Gratings", J. Lightwave Technol. 19, pp. 1580-1591, 2001.

Meltz et al, "In-Fiber Bragg Grating Tap", Digest of Conf. on Optical Fiber Commun, 1990 Technical Digest Series 1, (Optical Society of America, Washington, DC 1990), p. 24.

Lee et al "Polarization-Mode Coupling in Birefringent Fiber Gratings" J. Opt. Soc. Am. A 19, pp. 1621-1632, 2002.

Peupelmann et al, "Fibre-Polarimeter Based on Grating Taps", Electron. Lett. 38, pp. 1248-1250, 2002.

Mihailov et al, "UV-Induced Polarization-Dependent Loss (DPL) in Tilted Fibre Bragg Gratings: Application of a PDL equaliser" IEE Proc.-Optoelectron, 149, No. 5/6, pp. 211-216, Oct./Dec. 2002.

Zhou et al, "Two-Dimensional Optical Power Distribution of Side-Out Coupled Radiation from Tilted FBGs in Multimode Fibre", Electronic Ltrs, Apr. 17, 2003; vol. 39, No. 8.

Reyes et al, "Tunable PDL of Twisted-Tilted Fiber Gratings", IEEE Photon. Technol. Lett. vol. 15, No. 66, Jun. 2003, pp. 828-830.

Feder et al, "In-Fiber Spectrometer Using Tilted Fiber Gratings", IEEE Photonics Technol. Lett, vol. 15, No. 7, Jul. 2003, pp. 933-935.

Li et al, "Scattering from Nonuniform Tilted Fiber Gratings", Optics Letters, vol. 29, No. 12, Jun. 15, 2004, pp. 1330-1332.

Walker et al, "Optimizing Grating Based Devices with the Volume Current Method", Photonics North 2004: Optical Components and Devices, Proceedings of SPIE vol. 5577, pp. 284-292.

Walker et al, "Shaping the Radiation Field of Tiled Fiber Bragg Gratings", J. Opt. Soc. Am. B. vol. 22. No. 5, May 2005, p. 962-975.

Fonjallaz et al, "Bragg Gratings with Efficient and Wavelength-Selective Fiber Out-Coupling", Journal of Lightwave Technol. vol. 15, No. 2, Feb. 1977, pp. 371-376.

Pureur et al, "Optical Power Transversely Scattered from Fiber Bragg Gratings: Far-Field Measurements and Modeling", J. Opt. Soc. Am. A. vol. 14, No. 2, Feb. 1997, pp. 417-424.

Li et al, "Effect of Grating Imperfections on Devices Based on Tilted Fiber Gratings", OFC 2004, Feb. 23-27, 2004; vol. 2.

* cited by examiner

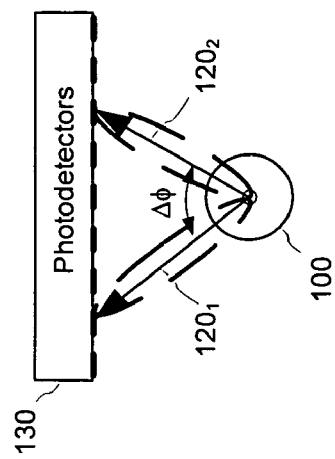
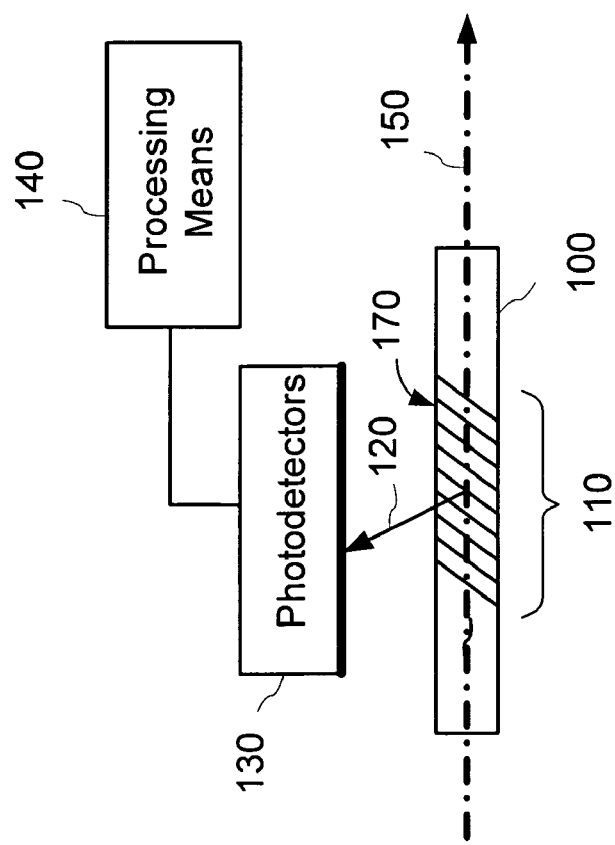
FIG. 4B
FIG. 4A

OPTICAL DEVICE INCORPORATING A TILTED BRAGG GRATING

CROSS-REFERENCE TO RELATED APPLICATIONS

The present invention claims priority from U.S. Provisional Patent Application No. 60/626,864 filed Nov. 12, 2004, entitled "IN-LINE FIBER POLARIMETER/SPECTRUM ANALYZER/TUNABLE POLARIZER/BEAM STEERING DEVICE", which is incorporated herein by reference.

TECHNICAL FIELD

The present invention generally relates to waveguide devices for measuring a characteristic of light, and more particularly to waveguide Bragg grating based devices out-coupling azimuthally dispersed light for measuring its spectral characteristics.

BACKGROUND OF THE INVENTION

Tilted, or blazed Bragg gratings formed in optical waveguides, and in particular—in optical fibers are known for their ability to out-couple light propagating in the waveguide into a leaky mode exiting the waveguide in one or more locations along the waveguide length, thus providing an optical tap or taps. In many optical systems, such a grating-based optical tap is useful in capturing and monitoring a signal passing through the optical waveguide.

U.S. Pat. No. 5,061,032, issued to G. Meltz et al., discloses a particular optical fiber tap arrangement that utilizes a blazed, chirped refractive index grating selected to redirect light guided in the fiber such that it comes to a focus at a point outside of the fiber. The patent also discloses that the angle of the external path of the redirected light to the fiber axis that results in the constructive interference is peculiar to the respective central wavelength ($\lambda$).

The wavelength-dependent tap taught by Meltz et al required a relatively large blaze angle, preferably at least 22 degrees, to achieve the desired redirection of the light guided in the fiber core to light in space outside of the fiber. This relatively large blaze angle was found to result in polarization sensitivity, when the fraction of light that is redirected by the grating depends on the polarization of the incident guided light. U.S. Pat. Nos. 5,832,156, 5,850,302 and 6,002,822 issued to Strasser et al disclose dispersive optical taps for wavelength monitoring, wherein the undesirable polarization sensitivity of the tapped fraction was reduced by using blazing angles that are smaller than 15 degrees for coupling the guided mode to one or more cladding modes. Appropriate coupling means, comprising e.g. a glass prism, are further provided for coupling the cladding modes to radiation modes and for dispersing the out-coupled light along the fiber axis in dependence on the wavelength; an array of photodetectors disposed outside of the waveguide along the fiber axis is provided for determining spectral content of the guided mode in dependence on the light signal location along the array.

One of the drawback of the dispersive tap taught by Meltz et al is that it requires special optical coupling or optical beam modifying elements, in addition to the blazed grating, to out-couple light from the optical fiber. A recent U.S. Pat. No. 6,885,792 issued to Eggleton et al, discloses a wavelength monitoring system comprising a series of discrete blazed gratings for first spatially separating individual wavelength bands within the optical fiber along its axis and for out-coupling these spatially-separated bands from the fiber guiding mode to radiation modes, and then detecting theses out-coupled bands in the near field using inexpensive detecting apparatus, without any, or at least most, optically modifying elements. However, this solution requires forming multiple gratings along the fiber length, which increases the tap size and grating writing complexity.

Several prior-art fiber-optic devices exploit the polarization sensitivity of the light out-coupled by a blazed, or tilted, Bragg grating having a large tilt angle. These devices employ tilted fiber Bragg gratings that out-couple light in different azimuthal directions about the fiber axis. For example, U.S. Pat. No. 6,211,957 to Edorgan discloses an in-line polarimeter comprising four consecutive blazed grating inscribed with four different orientations to the fiber axis (0.degree., 90.degree. and 45.degree., 135.degree.) and UV-induced waveplates, for determining four Stokes parameters. Since each grating in this device out-couples light in one azimuthal direction, a relatively complex gratings and photodiodes arrangement is required for the polarimeter to function. U.S. Pat. No. 6,591,024 to Westbrook discloses an in-line fiber device using blazed gratings that combines the wavelength sensitivity of the in-plane, or longitudinal out-coupling angle with azimuthal polarization sensitivity to provide a combined spectrometer/polarimeter fiber device. In all these devices, each of the Bragg gratings couples light predominantly in one azimuthal direction defined by the grating tilt orientation within the fiber, with the coupling efficiency dependent on the tilt orientation relative to a polarization plane of the incident light.

Recently, it was shown that a blazed Bragg fiber grating can be formed in an optical fiber so that it out-couples monochromatic light simultaneously in two different azimuthal directions, or two spatially separated intensity maxima, which were found to be sensitive to the light polarization (J. Peupelmann, E. Krause, A. Bandemer and C. Schäffer, "Fibre-polarimeter based on grating taps," Electron. Lett. 38, 1248-1250, 2002). This effect was attributed by the authors to the lens effect of the fibre surface leading to differently orientated grating regions in the fibre core during the grating inscription process, resulting in the coupling out of different states of polarization (SOPs) in different directions, which can be viewed as a simultaneous formation of two blazed gratings in the fiber during the grating inscription. U.S. Pat. No. 6,816,260 issued to Peupelmann et al discloses an in-line polarimeter that exploits polarization sensitivity of these intensity maxima to reduce the number of blazed gratings required for performing polarization state measurements. However, the inventors did not provide any teaching of wavelength sensitivity of the azimuthal separation of the maxima.

An object of the present invention is to provide an in-line fiber-optic spectrometer that uses azimuthal distribution of out-coupled light for spectral measurements.

It is another object of this invention to provide a compact waveguide Bragg grating device for measuring a characteristic of light propagating therein using wavelength dispersion of the light coupled out of the waveguide in a transverse to the waveguide direction.

It is another object of this invention to provide an in-line tilted Bragg grating based fiber-optic spectrometer having a photodetector array positioned normally to the fiber axis.

SUMMARY OF THE INVENTION

In accordance with the invention, a device for measuring a characteristic of light propagating therein is provided, comprising a waveguide for supporting the light propagating therein, the waveguide having an optical axis, a Bragg grating formed in the waveguide for coupling at least a portion of the light out of the waveguide through a side surface thereof, and for dispersing the at least a portion of the light azimuthally about the optical axis in dependence on a wavelength of the light, photo-detecting means disposed to receive the at least a portion of the light from the Bragg grating for detecting an azimuthal distribution of light coupled out of the waveguide about the optical axis; and, processing means for receiving information from the photo-detecting means for determining the wavelength from the detected azimuthal distribution of light.

In one aspect of the invention, the Bragg grating is designed to operate in a pre-determined wavelength range substantially detuned from a Bragg wavelength corresponding to a maximum coupling efficiency of the Bragg grating, and acts as a wavelength sensitive dispersion element, spreading the radiated light of different wavelengths azimuthally about the fiber axis.

In accordance with another aspect of this invention, the Bragg grating is designed for directing substantial portions of the light coupled out of the waveguide in at least two different directions about the optical axis, wherein said two different directions are characterized by variable azimuthal angles that change when the wavelength changes, and wherein the processing means of the device are programmed for determining i) a wavelength value according to an azimuthal angle of the light coupled out of the waveguide, and ii) a polarization characteristic of the light from relative magnitudes of said portions of the light.

Another feature of the present invention provides a method of determining a wavelength of light propagating in a waveguide, comprising the steps of: providing a tilted Bragg grating in the waveguide for coupling at least a portion of the light out of the waveguide to form out-coupled light, wherein the tilted Bragg grating in the waveguide is characterized by a Bragg wavelength substantially different from the wavelength of the light, and has at least a period selected so as to direct a substantial portion of the out-coupled light in a direction which rotates about an optical axis of the waveguide by a substantially non-zero azimuthal angle when the wavelength of the light changes; determining a value of the azimuthal angle using photo-detecting means sensitive to the azimuthal angle of the out-coupled light; and, determining a value of the wavelength from the value of the azimuthal angle using pre-determined calibration data.

BRIEF DESCRIPTION OF THE DRAWINGS

The invention will be described in greater detail with reference to the accompanying drawings which represent preferred embodiments thereof, wherein:

FIG. 4A is a schematic diagram showing a side view of a Bragg grating based device for measuring wavelength-sensitive azimuthal distribution of the out-coupled light according to the present invention;

FIG. 4B is a schematic diagram showing a front view of the Bragg grating based device shown in FIG. 4A;

DETAILED DESCRIPTION

Figure 1:
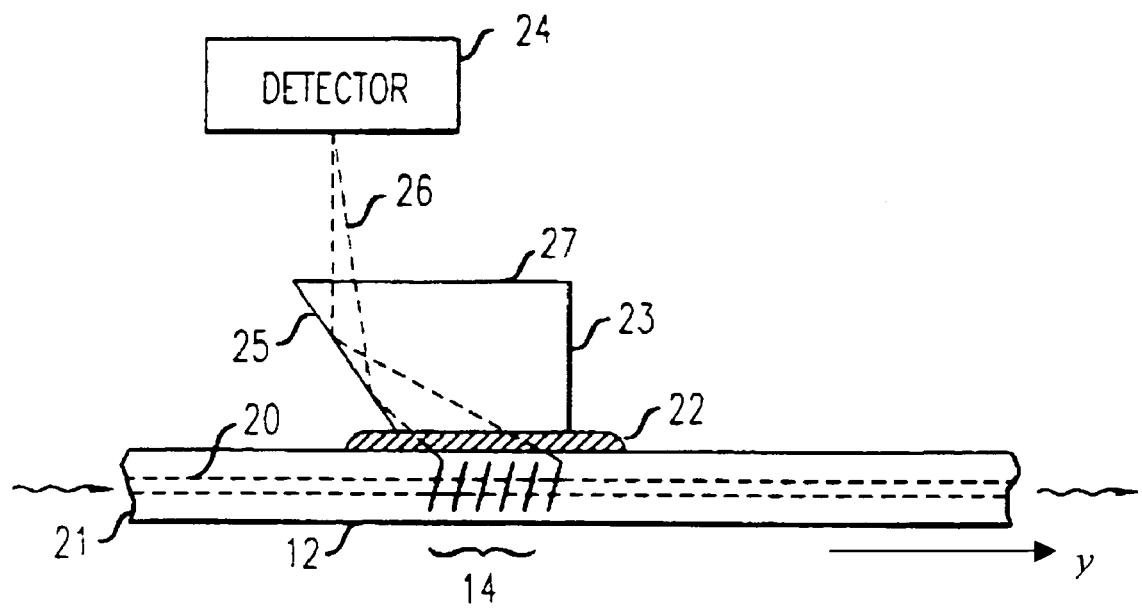
FIG. 1 is a diagram of a prior-art in-line fiber spectrometer.

Referring first to FIG. 1, a prior-art in-line fiber spectrometer typically includes a chirped blazed fiber Bragg grating (FBG) 14 formed in an optical fiber 12, and a photodetector array 24 for receiving light out-coupled from the fiber 12 by the grating 14. Additional coupling optics, e.g. a glass prism 23 having a reflecting surface 25, and an index-matching medium 22 between the glass prism 23 and the fiber 12, can be used for directing light out of the fiber cladding onto the photodetector array, in particular for gratings with low blaze angle. The chirped fiber Bragg grating 14, in cooperation with the coupling optics, directs light out of the fiber 12 at an angle to the fiber axis which depends on the wavelength, and focuses it at wavelength-dependent locations along the fiber axis on the photodetector array 24, as illustrated in FIG. 2.

Figure 2:
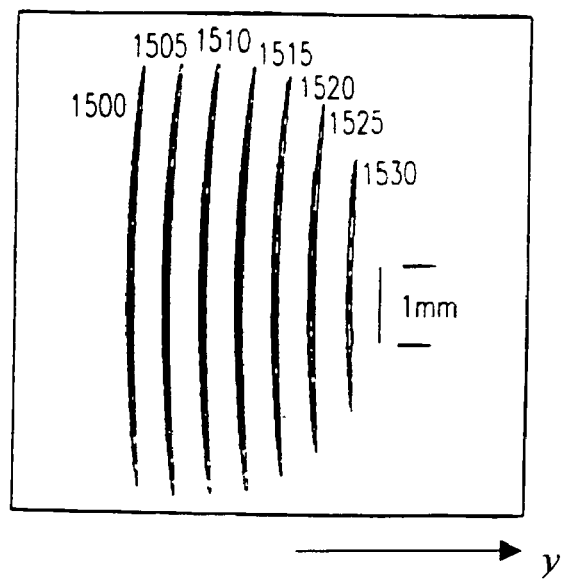
FIG. 2 is a diagram illustrating spatial dispersion of the out-coupled light for the prior-art in-line fiber spectrometer shown in FIG. 1.
Figure 3:
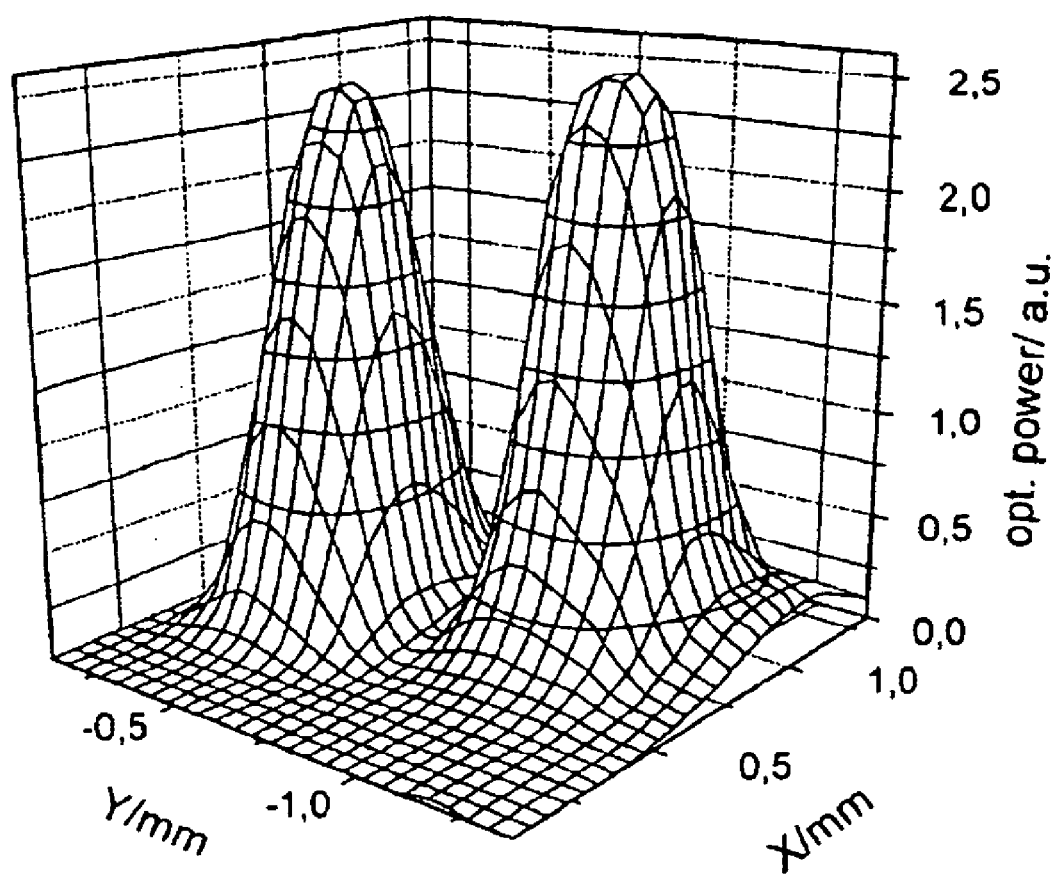
FIG. 3 is a 3D view of a double-peak distribution of an out-coupled light for a prior-art polarimeter comprising a specially-formed fiber Bragg grating.

Note, that in these prior-art FBG-based devices, the azimuthal distribution of the out-coupled light, which corresponds to a vertical direction in FIG. 2, has a single, relatively wide maximum, and its shape in a transverse to the fiber direction is substantially wavelength-independent. Peupelmann et al, in U.S. Pat. No. 6,816,260, disclosed that a blazed FBG can be formed so to couple light into two spatially-separated intensity maxima about the fiber axis. These two maxima are shown in FIG. 3, where the y coordinate is orthogonal to the fiber axis and corresponds to the transverse direction with respect to the fiber axis, and the x coordinate is directed along the fiber axis. These azimuthally-separated maxima were found to be polarization-sensitive, but no wavelength sensitivity of their relative separation was reported. Peupelmann et al attributed the existence of these maxima to a lens effect of the fiber surface leading to a formation of differently orientated grating regions in the fiber core during the grating inscription process, resulting in the coupling out of different states of polarization (SOPs) in different directions; the proposed mechanism can be viewed as a simultaneous formation of two blazed gratings in the fiber during the grating inscription.

We have found, however, that for a certain combination of blazed grating parameters, blazed, or tilted Bragg gratings having uniform grating orientation and characterized by a single tilt direction and tilt angle, can out-couple light in multiple a zimuthally-separated directions, or intensity maxima, with their angular separation being substantially wavelength-dependent. Advantageously, the wavelength sensitivity of the azimuthal angle between these intensity maxima enables providing a compact in-line FBG-based spectrometer and other wavelength-sensitive devices, as described hereinafter in this specification in sufficient detail to enable one skilled in the art to practice the invention.

An exemplary embodiment of the waveguide Bragg grating device for measuring a characteristic of light propagating therein is shown in FIGS. 4A and 4B. A tilted FBG 110 is formed within an optical waveguide in the form of an optical fiber 100 in such a way that, when light at a wavelength $\lambda$ propagating along the fiber 100 impinges upon the FBG 110, at least a portion of it, which is hereinafter referred to as the out-coupled light and is schematically shown in FIG. 4A with an arrow 120, is coupled out of the fiber 100 through a side surface thereof 170, and dispersed by the FBG 110 azimuthally about an optical axis 150 of the fiber 100 in dependence on the wavelength $\lambda$. This is accomplished by selecting the FBG parameters so that, for a pre-determined operating wavelength range, the FBG 110 operates substantially away from the Bragg condition of maximum out-coupling efficiency within a specific wavelength detuning range, as described in detail hereinafter.

The Bragg grating 110 is thereby adopted for directing a substantial portion of the light coupled out of the waveguide in a direction characterized by an azimuthal tap angle $\phi$ in a plane normal to the optical axis 150 of the waveguide 100, wherein said azimuthal tap angle changes when the wavelength $\lambda$ changes within the pre-determined wavelength range.

Note that in the context of this specification, the words "dispersed azimuthally about an optical axis" in reference to the out-coupled light, mean that the out-coupled light is directed along one or more optical paths having differing projections onto a plane crossing the Bragg grating normally to the optical axis depending on the wavelength; the words "azimuthal angle" or "azimuthal tap angle" are used herein to mean an angle between one of said projections and a pre-defined direction in the plane normal to the optical axis. The words "azimuthal distribution of light" or "azimuthal distribution of light about the optical axis" are used herein to mean the out-coupled light intensity as a function of the azimuthal angle. The terms "tilted" and "blazed", in reference to a Bragg grating, are deemed equivalent in the context of this specification, and are used therein interchangeably to mean a Bragg grating having planes of equal phase of the refractive index modulation that are not perpendicular to the optical axis, but are tilted towards the optical axis; these tilted planes, which are spaced by a grating period $\Lambda$, are hereinafter referred to as the grating planes.

Photo-detecting means 130, preferably in the form of an array of photo-detectors, such as a photodiode array, is disposed transversely to the optical fiber 100 so to detect the azimuthal distribution of the out-coupled light, and/or variations thereof when the wavelength $\lambda$ changes. In other embodiments, the photodetector array 130 can be disposed in other orientations to the fiber 100, and optically coupled thereto so to detect the azimuthal distribution of the out-coupled light. In one embodiment shown in FIG. 4C, the photo-detector array 130 is disposed circumferentially about the optical fiber 100 in close proximity thereto to receive the out-coupled light in the near field, with an optional index matching medium 160 disposed between the photodiode array 130 and the optical fiber 100. In other embodiments, the photo-detecting means 130 may be formed using a plurality of photo-detecting elements spaced apart from each other both along the optical axis 150, and transversely thereto, so to detect the azimuthal distribution of the out-coupled light about the optical axis 150, wherein different portions of the out-coupled light originate from different locations along the fiber axis 150. The optical fiber 100 is preferably single-mode. However, in other embodiments the optical fiber 100 can be multi-mode.

One or more characteristics of the azimuthal distribution of the out-coupled light detected by the photo-detector array 130, or of a change in this distribution in dependence on changing $\lambda$, is communicated to processing means 140, which is coupled to the photo-detector array 130 for determining at least the wavelength $\lambda$ from the detected azimuthal distribution of light. The processing means 140 can be embodied as a suitably programmed microprocessor with memory, and/or a suitably programmed Field Programmable Gate Array device (FPGA), or other appropriate hardware as would be known to those skilled in the art, and is generally referred to hereinafter as the processor 140. In a preferred embodiment, the processor 140 includes an analog to digital converter (ADC) at the input for converting the electrical signals received from the photodiode array 130 to a digital form. In other embodiments, the processor 140 can employ hardware suitable for all-electrical or all-optical analog or digital signal processing.

In one embodiment, the tilted Bragg grating 110 is formed so that for a non-polarized incident light, the out-coupled light is directed primarily along two or more optical paths spatially separated about the optical axis 150, e.g. the paths $120_1$ and $120_2$ separated by a non-zero variable azimuthal angle $\Delta\phi$ as shown in FIG. 4B in projection onto a plane normal to the fiber axis 150, with the azimuthal separation angle $\Delta\phi$ being dependent on the wavelength of the out-coupled light $\lambda$. When the wavelength $\lambda$ of the incident light changes, the optical path directions $120_1$ and $120_2$ change, so their projections on the normal to the fiber plane rotate about the optical axis 150 in opposing directions, e.g. either towards or away from each other, depending whether the wavelength increases or decreases, as will be described in detail hereinafter in this specification. If the incident light is linearly polarized, depending on the polarization orientation, out-coupling of the light along one of the two optical paths $120_{1,2}$ can be suppressed for a certain azimuthal angle of that optical path, so that the out-coupled light is predominantly directed in a single, however wavelength-dependent, direction.

Independently on the polarization, the FBG 10 acts as a wavelength sensitive dispersion element, spreading the radiated light of different wavelengths azimuthally about the fiber axis, as will be described hereinafter more in detail. Relative presence of the wavelength λ in the incoming light can be identified by the processor 140 by appropriate processing of the electrical signals received from the photodiode array 130. For example, in one embodiment the processor 140 receives electrical signals from each of the photodiode elements of the photodiode array 130, said electrical signals being proportional to optical power received by corresponding photodiode elements according to their position in the array 130, and then finds intensity maxima of the out-coupled light and their positions along the array using one or more known peak finding algorithms, and finally identifies wavelength composition of the out-coupled light comparing the peak positions using e.g. a pre-determined look-up table containing saved calibration values.

As should be clear from the preceding functional description of the exemplary embodiments of the optical device of to the present invention, functioning of the device is based on wavelength sensitivity of the azimuthal distribution of the out-coupled light, which substantially changes its shape when the light wavelength changes. Note, that the prior-art tilted Bragg grating based devices will not normally exhibit this behavior in their target operational wavelength range. As will be described hereinbelow, in order for the Bragg grating to disperse the out-coupled light in different directions about the waveguide axis depending on the wavelength within a pre-determined wavelength range, the grating's parameters, and especially the grating period Λ, have to be specifically selected for the target wavelength range. In particular, the grating 110 has to have a Bragg wavelength which is shifted away, or substantially de-tuned from the pre-determined target wavelength range of the device operation. The following section of this description presents a theoretical description for the azimuthal distribution of the out-coupled light and its dependence on the waveguide and grating parameters, enabling one skilled in the art to design the Bragg grating with characteristics required for functioning of the device of the present invention.

Theory

The coupling of light out of a tilted Bragg grating can be analyzed using a so-called volume current method (VCM). The VCM is a perturbation analysis tool rooted in the Huygens-Fresnel principle, which is useful for solving waveguide radiation problems that result from small refractive index fluctuations. In this method, a Bragg grating is modeled as a distribution of dipoles that re-radiate the energy supplied by an incident electromagnetic wave, e.g. the light propagating in the optical fiber 100 or, in another, e.g. planar, optical waveguide. This method has been successfully used for many applications. Its application to tilted Bragg gratings has been described by Li et al in an article "Volume Current Method for analysis of tilted fiber gratings," J. Lightwave Technol. 19, 1580-1591, 2001, which is incorporated herein by reference.

The azimuthal distribution of light coupled out of a an optical fiber by a tilted Bragg grating, and the dependence of this distribution on the light wavelength, has been further analyzed in considerable detail in an article entitled "Shaping the radiation field of tilted fiber Bragg gratings", by R. Walker et al, published in J. Opt. Soc. Am. B, vol. 22, No 5, May 2005, and co-authored by the inventors of the current invention, which is incorporated herein by reference. A brief description of the analysis and its main results are given herein below.

Before proceeding with the description of the results of the VCM analysis of distribution of light coupled out of a fiber by a tilted Bragg grating, it should be noted that several assumptions have been made in derivation of formulas and mathematical expressions given in this specification, which can therefore in some cases give qualitative rather than quantitative descriptions of the corresponding relationships. They are nevertheless useful for illustrating main features of the azimuthal distribution of the out-coupled light and relationships between this distribution, the grating parameters and characteristics of the guided light, and as guidelines in device design. Once the guidelines are established, device parameters can be further optimized for a particular application using standard engineering techniques known to those skilled in the art, for example using a combination of rigorous numerical analysis employing one of commercially available software packages for waveguide and beam propagation analysis, and experimental determination of key waveguide parameters.

Figure 5B:
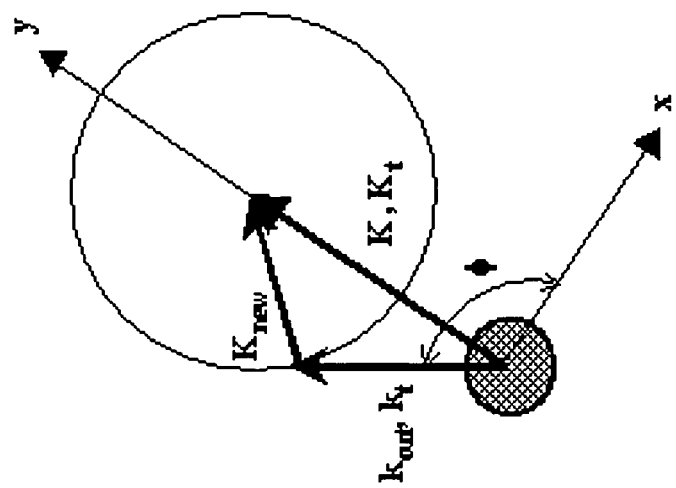
FIG. 5B is a projection of the vector diagram shown in FIG. 5A on a plane normal to the optical fiber axis.
Figure 5A:
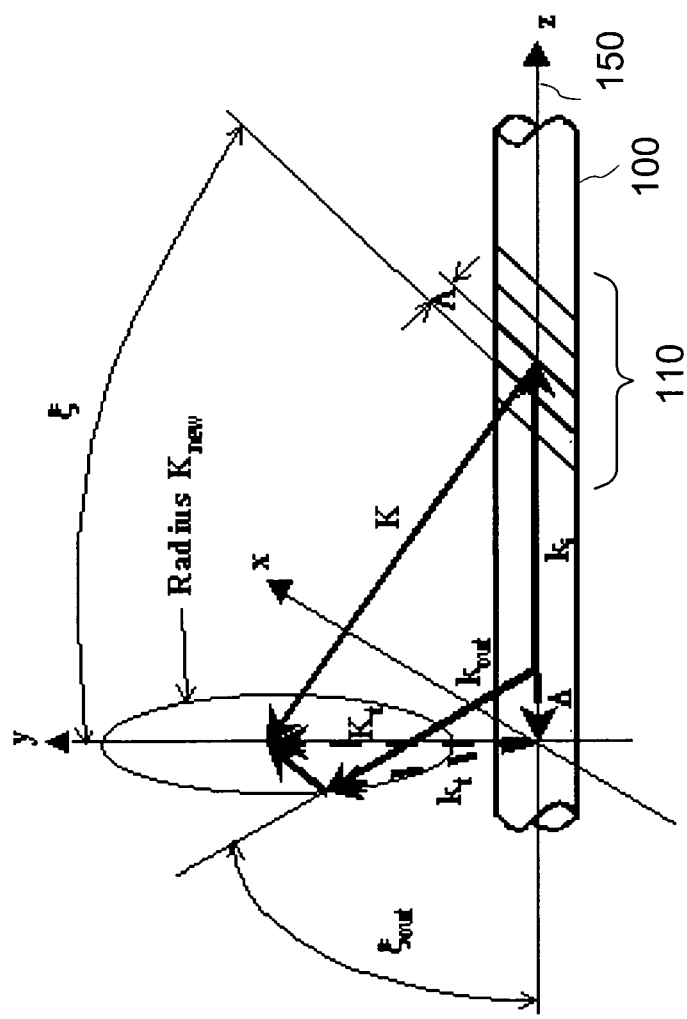
FIG. 5A is a vector diagram illustrating the coupling of light out of the Bragg grating based device shown in FIG. 4A.

In particular, results described hereinafter have been derived using the following assumptions:

a) the waveguide wherein a tilted Bragg grating is formed is a single mode optical fiber with a step index profile, having a core of radius $a_{core}$ and refractive index $n_{core}=n_0$, a cladding having a cladding radius $a_{cladding} \gg a_{core}$, and a cladding refractive index $n_{clad}$, with a small core-cladding index difference $\sqrt{\delta_z} \ll 1$, $\delta_z = 1 - n_{clad}^2/n_{core}^2$;

b) the tilted Bragg grating is a relatively weak sinusoidal one-dimensional uniform index modulation of the fiber core, with the index modulation amplitude $\delta n \ll n_0$, and an infinite length along the fiber axis;

c) the guided mode's longitudinal field component is neglected and the guided wave's polarization is assumed to be normal to the fiber axis;

d) the out-coupled radiation is detected at some distance from the fiber axis 150, so that $$rk_t \gg \sqrt{\frac{9}{128}}, \quad (1)$$

where r is a radial distance from the fiber axis to a point where the radiation is detected, and $k_t$ is a magnitude of a transverse component of the radiation wavevector in the cladding $k_{out}$, $|k_{out}|=2\pi n_{clad}/\lambda$, as shown in FIGS. 5A,B. For λ<2 μm, condition (1) is typically satisfied a few microns away from the fiber core.

FIG. 5A shows a vector diagram illustrating coupling of light out of the optical fiber 100 by the tilted Bragg grating 110, in reference to a rectangular coordinate system (x,y,z) having axis z directed along the optical fiber axis 150. The grating 110 is further characterized by a tilt angle ξ and a modulation period Λ, as shown in FIG. 5A. The orthogonal axis y is selected so that the plane (y,z) includes a grating vector K, which is directed normally to the grating planes and has an amplitude K=2π/Λ. FIG. 5B shows a projection of the vector diagram shown on FIG. 5A on the (x,y) plane.

Light propagates in the fiber 100 in the form of a guided mode characterized by an effective refractive index $n_{eff}$, and has a wavevector $k_i=2\pi n_{eff}/\lambda$ directed along the fiber axis z, as shown in FIG. 4A. The Bragg grating 110 couples this fiber-guided mode to a continuum of radiating modes, each with the wavevector $k_{out}$ directed in a different direction out of the fiber core, i.e. characterized by a different combination of a longitudinal tap angle $\xi_{out}$ and an azimuthal angle φ; these angles are shown in FIG. 5 for a particular $k_{out}$. Note that the azimuthal angle φ is defined herein as an angle between a projection $k_t$ of the wavevector $k_{out}$ onto the plane (x,y), which is normal to the fiber axis z 150.

The guided mode is coupled most efficiently to a radiating mode having a wavevector $k_{out}=k_{outBragg}$, which satisfies the well-known vector Bragg equation (2), also referred to in the art as the phase matching condition:

$$k_i + K = k_{outbragg}. \quad (2)$$

The wavevector $k_{outBragg}$ lies in the (y,z) plane normal to the grating planes, and defines a direction of maximum out-coupling efficiency, which corresponds to the azimuthal angle φ=90°. Equation (2) defines also the Bragg wavelength $\lambda_{Bragg}$, i.e. the wavelength corresponding to the highest out-coupling efficiency of the Bragg grating.

If the wavevector $k_{out}$ deviates from $k_{outBragg}$, the coupling efficiency generally decreases as a result of a destructive interference of light scattered from different portions of the grating 110. This decrease typically becomes more severe, as the number of participating grating periods increases in a particular direction. Since the grating 110 is much more localized in the transverse y direction than in the longitudinal z direction, the coupling efficiency falls off much faster when a detuning vector $K_{new}=(k_{outBragg}-k_{out})$ is directed along the longitudinal z axis, than when it is normal thereto. Therefore, in the theoretical description hereinbelow it is assumed that the detuning vector $K_{new}$ lies in the (x,y) plane, as shown in FIG. 5B, and its amplitude $K_{new}$ is referred to hereinafter as a detuning parameter.

With the aforestated assumptions (a)-(d), the Poynting vector of the radiation field can be written in the following form:

$$\vec{S} \approx \frac{\pi k_0 c \kappa^2 E_0^2}{4 \varepsilon r} \cdot f_1 \cdot f_2 \cdot \left( \hat{r} + \frac{\Delta}{k_t} \hat{z} \right) \quad (3)$$

where $E_0$ is the electric field amplitude of the guided light, δn is the index modulation, $k_0$ is the free space wavevector magnitude (2π/λ) and:

$$\kappa = \varepsilon_0 n_0 \delta n;$$

$$k_t = \sqrt{k_0^2 n_0^2 - \Delta^2};$$

$$\Delta = k_0 n_{eff} - K_g;$$

$$K_g = \frac{2\pi}{\Lambda} \cos\xi$$

A magnitude $S = |\vec{S}|$ of the Poynting vector (3) is a function of the azimuthal angle φ, which defines the azimuthal distribution S(φ) of the optical power of the out-coupled light. This azimuthal distribution is also referred to hereinafter in this specification as the grating response S(φ).

The factor $f_1$ in equation (3) describes polarization effects, i.e. effects which depend on a particular polarization of the guided light incident on the grating 110. In the case of a linearly polarized light, it depends on a polarization angle δ between the guided electric field and the +x axis, as described by the following expression (4):

$$f_1 = \Delta^2 + k_t^2 \sin^2(\delta - \phi), \quad (4)$$

The azimuthal distribution of the out-coupled light is defined by the factor $f_2$, via the detuning parameter $K_{new}$:

$$K_{new} = \sqrt{K_t^2 + k_t^2 - 2K_t k_t \sin\phi}, \quad (5)$$

$$f_2 = \left( \frac{K_{new} a J_0(ua) J_1(K_{new}a) - u a J_1(ua) J_0(K_{new}a)}{K_{new}^2 u^2} \right)^2. \quad (6)$$

In equations (5), (6)

$$u = k_0 \sqrt{n_0^2 - n_{eff}^2},$$

$$K_t = -\frac{2\pi}{\Lambda} \sin\xi,$$

$$k_t = -\frac{2\pi}{\Lambda} \sin\xi_{out},$$

a is the core radius, and $J_\nu$ denotes a Bessel function of the first kind of order ν.

According to expression (3), the grating's angular and wavelength response S(φ,λ) is proportional to a product of a polarization dependent dipole—type scattering response described by the factor $f_1$, and the interference characteristic $f_2$ resulting from the grating's periodic structure.

The polarization-dependent factor $f_1$, when plotted in polar coordinates as a function of the azimuthal angle φ, 0≤φ<2π, h as a figure-eight shape typical for a dipole-type response, with two opposing maxima in azimuthal directions that are orthogonal to the polarization plane of the incident light. If the guided light incident on the grating is non-polarized, the dipole component $f_1$ is independent of the azimuthal angle φ, and the shape of the radiation field profile S(φ) is determined by the grating's interference properties through the factor $f_2$. The description hereinbelow is focused primarily on this azimuthal distribution of the out-coupled light, i.e. the light intensity distribution in a plane normal to the z axis 150 of the fiber 100, and on the dependence of this distribution on the wavelength λ, more particularly—on the wavelength detuning (λ−$\lambda_{Bragg}$), due to the interference effects.

General Characteristics of the $f_2$ Term

General characteristics of the azimuthal distribution of the radiation field profile S(φ), as determined by the interference factor $f_2$(φ), will now be analyzed in dependence on the wavelength λ of the incoming light. In doing so, it is convenient to present the azimuthal distribution S(φ) in terms of a normalized function $f_2$(φ) and three normalized unitless parameters au, $k_t/u$ and $K_t/k_t$:

$$f_{2-norm} = \frac{f_2}{a^2} \left( \frac{C J_1(C) J_0(D) - D J_1(D) J_0(C)}{C^2 - D^2} \right)^2 \quad (7)$$

Where D=au, and C is a normalized detuning parameter defined by equation (7a):

$$C = K_{new} a = au\left(\frac{k_t}{u}\right) \sqrt{1 - 2\left(\frac{K_t}{k_t}\right)\sin\phi + \left(\frac{K_t}{k_t}\right)^2}. \quad (7a)$$

In equations (7) and (7a), parameter D=au represents characteristics of the waveguide, such as a, $n_0$ and $n_{eff}$ at the wavelength of interest λ, while parameter $k_t/u$ relates the longitudinal tap angle $\xi_{out}$ to the waveguide's effective and core refractive indices $n_0$ and $n_{eff}$, respectively, and is therefore both waveguide- and grating-dependent. The ratio $K_t/k_t$, on the other hand, is a measure of the wavelength detuning $(\lambda - \lambda_{Bragg})$, with $K_t/k_t=1$ for $\lambda=\lambda_{Bragg}$, $K_t/k_t<1$ for $\lambda>\lambda_{Bragg}$, and $K_t/k_t>1$ for $\lambda<\lambda_{Bragg}$.

Analysis of equations (7), (7a) shows that this ratio, via the normalized detuning parameter C, defines to a large degree the azimuthal dependence of the out-coupled light intensity $S(\phi) \sim f_2(\phi)$. Moreover, it turns out that the very shape of the azimuthal light distribution $S(\phi)$ may change when the ratio $|K_t/k_t|$ deviates from 1, i.e. in the case of a sufficiently large wavelength detuning. These changes, and corresponding regimes of operation relevant to the aforedescribed embodiment of the invention, will now be described with reference to FIGS. 6,7 illustrating an evolution of the azimuthal distribution of non-polarized light $S(\phi) \sim f_{2-norm}(\phi)$ when the ration $K_t/k_t$ decreases from unity.

Figure 6:
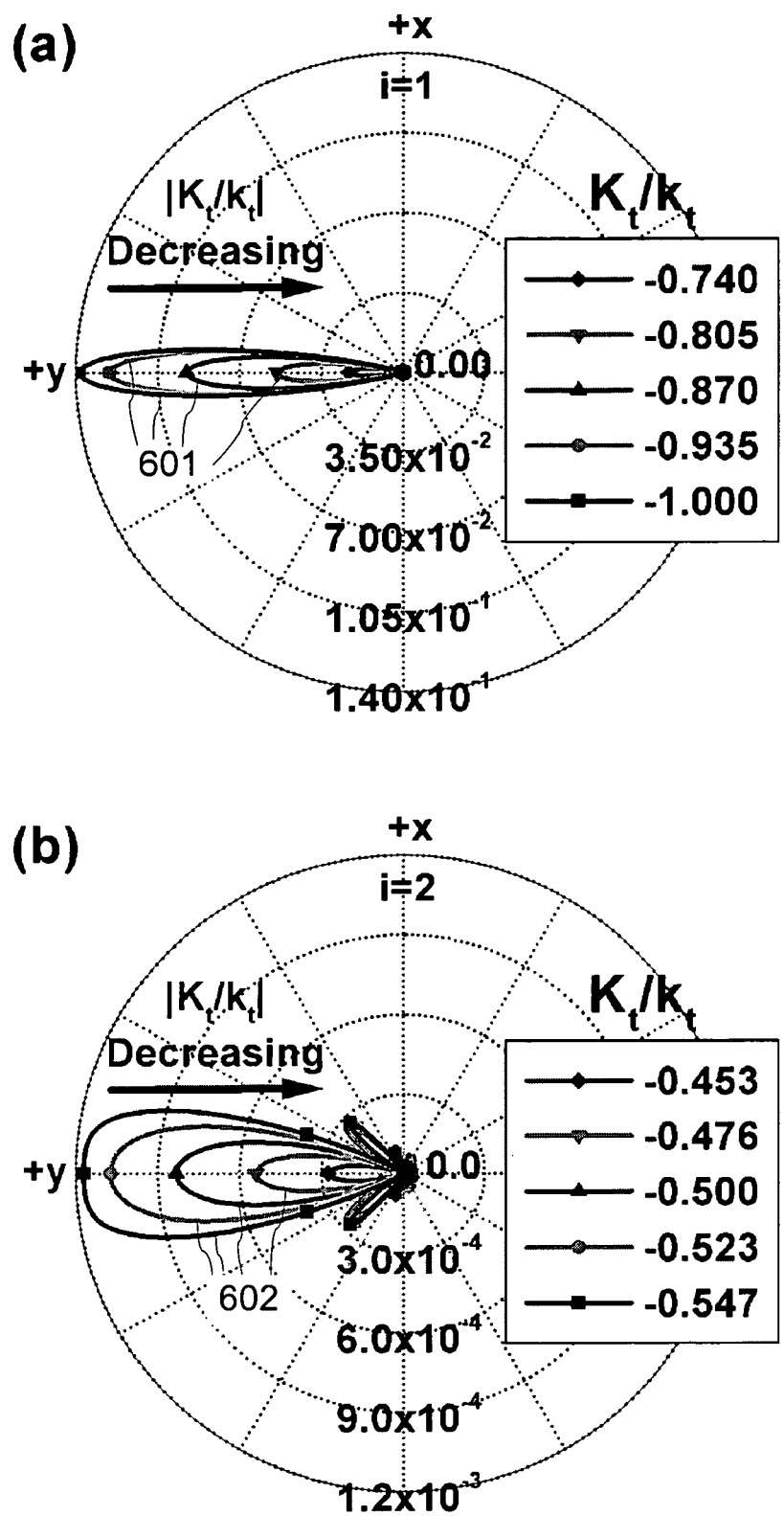
FIG. 6 is a diagram showing simulated distributions of the out-coupled light in a plane normal to the fiber axis for a centered-type spatial grating response in dependence on the wavelength detuning parameter $|K_z/k_z|$.
Figure 7:
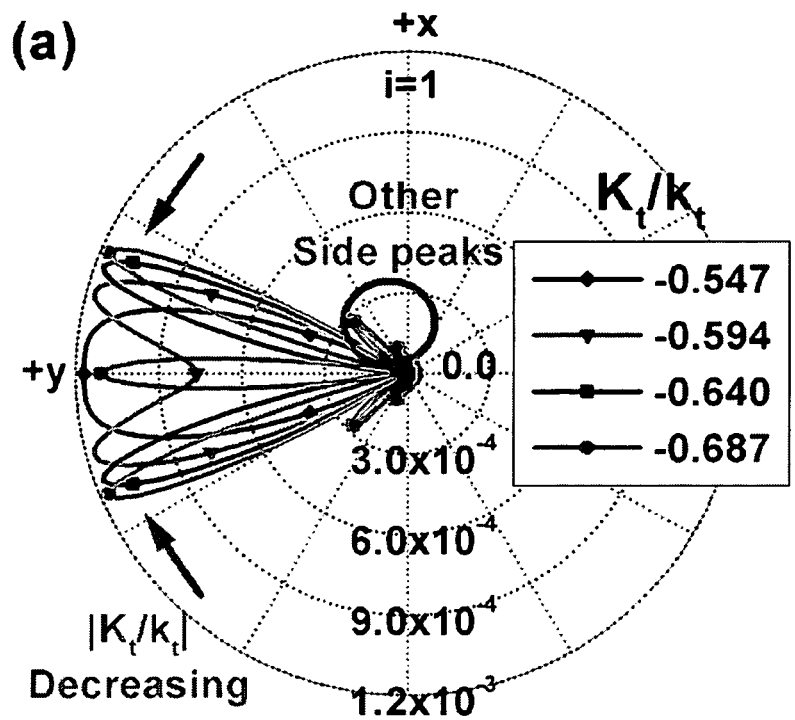
FIG. 7 is a diagram showing simulated distribution of the out-coupled light in a plane normal to the fiber axis for a split-type spatial grating response in dependence on the wavelength detuning parameter $|K_z/k_z|$.
Figure 7:
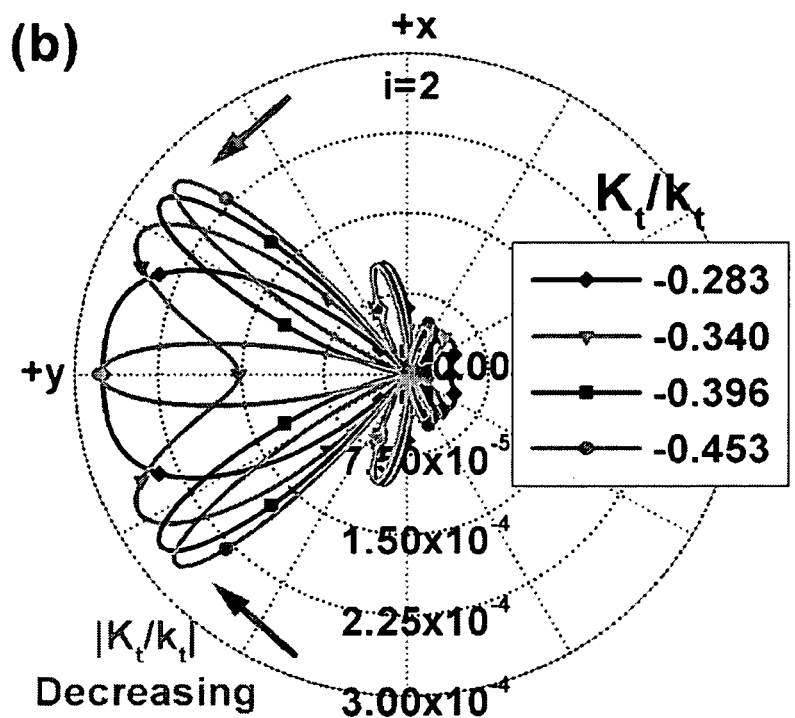

We found that, as the wavelength $\lambda$ deviates from the Bragg value $\lambda_{Bragg}$ and the ratio $|K_t/k_t|$ departs from unity, the grating operation alternates between two characteristic regimes defined by differing shapes of the azimuthal distribution of the outpolled light:

A) first, when the wavelength detuning is small and the ratio $|K_t/k_t|$ is equal or close to 1, the function $f_2(\phi)$ is approximately single-lobe, with the main peak aligned along the y-axis and having a maximum at $\phi=90°$, x=0, as shown in FIG. 6, and in accordance with the direction of the wavevector $k_{outBragg}$ of the radiating mode satisfying the Bragg condition (2). As the ratio $|K_t/k_t|$ further deviates from unity with increasing wavelength detuning, the magnitude of this central peak decreases; simultaneously, a number of smaller side lobes symmetrically positioned on both sides of the main lobe, which magnitude is substantially less wavelength-dependent than the central peak magnitude, become more prominent compared to the central peak, as shown in the bottom chart (b) in FIG. 6; this type of the azimuthal Bragg grating response $S(\phi)$ will be referred to hereinafter as the centered response;

B) if the wavelength detuning continues to increase, the magnitude of the central peak of the function $S(\phi)$ becomes at first about equal to, and then smaller than the magnitudes of the two adjacent side lobes, resulting at first in a three-peak azimuthal distribution of the out-coupled light changing to a two-peak distribution, wherein the Bragg grating is directing most of the out-coupled light in two different directions about the optical axis; importantly, the azimuthal angle $\Delta\phi$ separating these two different directions substantially depends on the wavelength $\lambda$, and decreases as the absolute value of the wavelength detuning increases; in effect, in this regime the initially un-polarized guided light is directed by the grating 110 along two directions, which rotate around the fiber axis when the wavelength $\lambda$ changes; this type of the azimuthal response $S(\phi)$ of the titled Bragg grating is referred to hereinafter as the split response.

When the wavelength detuning increases further, the two largest side lobes symmetrically-located about the y-axis merge, forming again a centered single-lobe response, wherein a main central peak of a considerably reduced magnitude aligned with the y axis is surrounded by a next pair of smaller side-lobes symmetrically spaced about the central peak and directed each in a different, wavelength-sensitive azimuthal direction about the optical axis z. As $|K_t/k_t|$ moves further away from unity, the response $S(\phi)$ will alternate between these two regimes. Hereinafter, the consecutive cycles of alternating centered and split responses are labeled with an integer counter i, with i=1 corresponding to a range of the $|K_t/k_t|$ ratio from unity, i.e. zero wavelength detuning, to a $|K_t/k_t|$ value when the first two side lobes merge to form a new central peak.

FIGS. 6,7 illustrate the aforedescribed general behavior of the azimuthal distribution $S(\phi)$ of the out-coupled light when the wavelength $\lambda$ decreases from the Bragg value $\lambda_{Bragg}$. By way of example, the following fiber and grating parameters are assumed: a=4.1 µm, $n_{eff}/n_0=0.99793$, $n_0=1.4493$, $\xi=45°$; the wavelength $\lambda$ of the incident light varies in the vicinity of 1.55 µm. FIG. 6 shows evolution of the grating azimuthal response function $S(\phi) \sim f_2(\phi)$ in the (x,y) plane with increasing wavelength detuning, or decreasing $|K_t/k_t|$, within the first two non-adjacent $|K_t/k_t|$ ranges, i=1,2, corresponding to the centered-type response. Similarly, FIG. 7 shows evolution of the function $S(\phi) \sim f_2(\phi)$ with decreasing $|K_t/k_t|$, within the first two non-adjacent $|K_t/k_t|$ ranges, i=1,2, corresponding to the split-type response.

Turning first to FIG. 6, we note that, when the ratio $|K_t/k_t|$ decreases from 1 to 0.74 and from 0.547 to 0.453, the magnitude of the central peaks 601 and 602, respectively, of the azimuthal response function substantially decreases. This amounts to decreasing of the grating coupling efficiency when the wavelength $\lambda$ detunes from the Bragg value $\lambda_{Bragg}$, which is well-know in the art. Although the wavelength sensitivity of the $S(\phi)$ peak magnitude can potentially be used for wavelength monitoring, power and polarization fluctuations of the fiber-guided incident light may obscure the wavelength sensitivity of such monitoring.

Turning now to FIG. 7, we see that when the ratio $|K_t/k_t|$ changes between 0.687 and 0.547, i=1, and between 0.453 and 0.283, i=2, the primary effect of the changing detuning is to change the azimuthal width of the grating response $S(\phi)$, rather than to change its magnitude. More particularly, increasing wavelength detuning within these ranges of the ratio $|K_t/k_t|$ leads to the response $S(\phi)$ changing from a three-lobe shape for $|K_t/k_t|=0.687$, i=1, and 0.453, i=2, to a two-lobe shape for $|K_t/k_t|$ between 0.640 and 0.594, and between 0.340 and 0.396, with the azimuthal separation between the outer, or side lobes of the response decreasing with increasing of the wavelength detuning, or $|K_t/k_t|$ changing away from unity, until the side lobes merge in a single peak centered at x=0, for $|K_t/k_t|=0.547$ and 0.283.

To the best of our knowledge, this regime of operation of the tilted Bragg grating 110, wherein the Bragg wavelength of the grating is substantially detuned from the wavelength $\lambda$ of the incident guided light, so that the grating directs substantial portions of the out-coupled light, and preferably most of the out-coupled light, in at least one of two distinct azimuthal directions, which change when the wavelength is changed so that the azimuthal angle separating these directions substantially depends on the wavelength detuning, has not been heretofore described in the art.

Advantageously, the tilted Bragg grating 110 operating in this split-response regime enables wavelength monitoring by detecting changes in the azimuthal peak position and/or their azimuthal separation, which obviates the aforementioned difficulties related to optical power and polarization fluctuations.

Note that the wavelength-detuned operation of the tilted Bragg grating in the regime of the split azimuthal response is characterized by a reduced coupling efficiency compared to operating at zero wavelength detuning, as can be seen e.g. by comparing magnitudes of the $S(\phi)$ responses shown in the top plots of FIGS. 6 and 7. This, however, may often be acceptable and even advantageous, if only a small portion of the fiber-guided light is to be tapped off for the wavelength monitoring.

Figure 8:
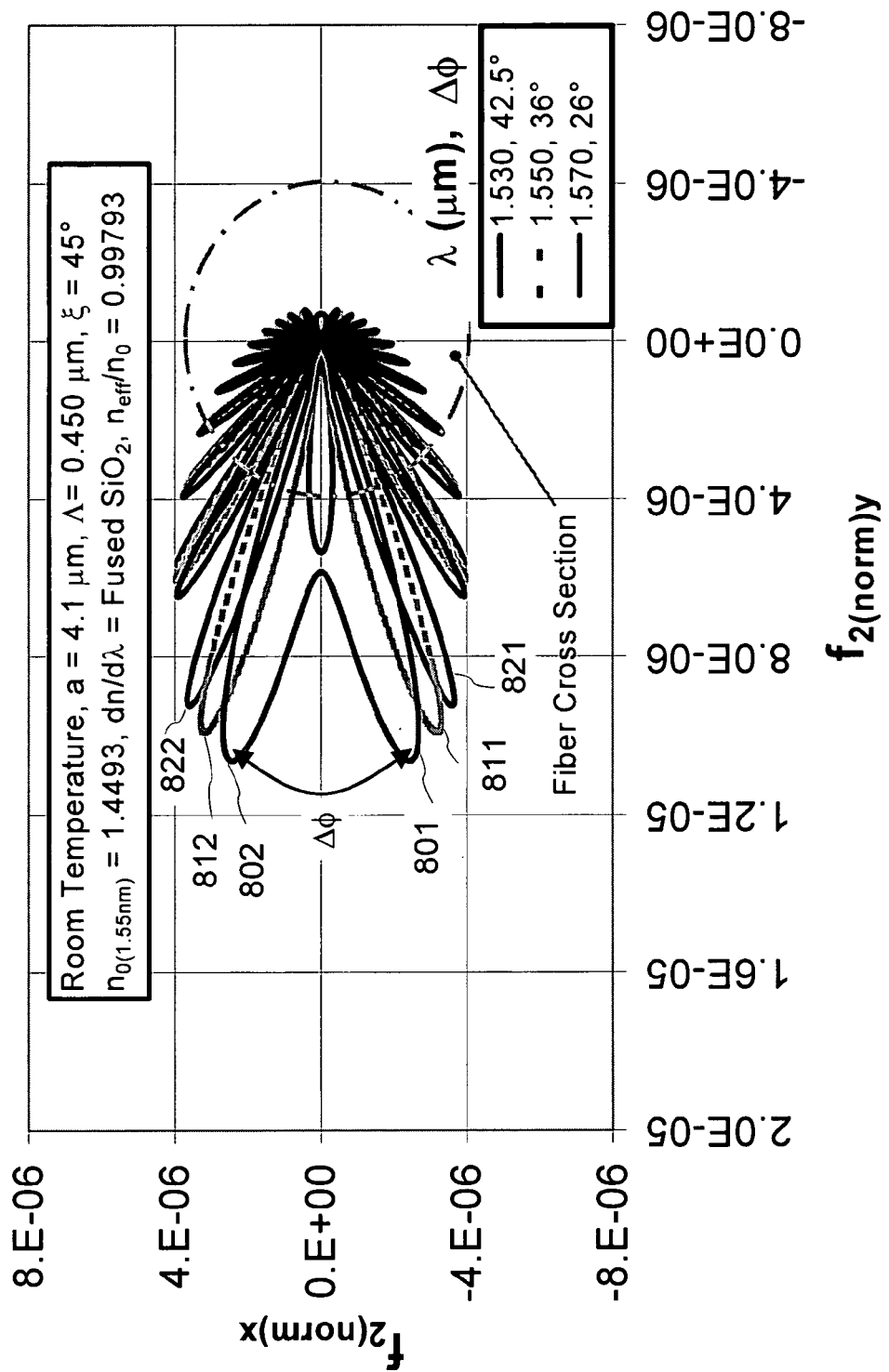
FIG. 8 is a diagram showing simulated distributions of the out-coupled light in a plane normal to the fiber axis for a split-type spatial grating response for three different wavelength values.

By way of example, FIG. 8 illustrates the narrowing of the azimuthal separation between the two largest side lobes for a split-type grating response $S(\phi)$, when the wavelength $\lambda$ of the incident light changes, for the exemplary set of grating and fiber parameters indicated in this FIG. Peaks 801 and 802 are the two largest side lobes of the grating response $S(\phi)$ corresponding to the guided light wavelength $\lambda=1.530$ μm, and their maxima are separated by an azimuthal angle $\alpha=42.5°$; peaks 811 and 812 are the two largest side lobes of the grating response corresponding to $\lambda=1.550$ μm, and their maxima are separated by a smaller azimuthal angle $\alpha=36°$; the peaks 821 and 822 are the two largest side lobes of the grating response corresponding to $\lambda=1.570$ μm, and their maxima are separated by a still smaller azimuthal angle $\alpha=26°$.

Turning now back to FIGS. 4A, B, in the preferred embodiment of the present invention the tilted fiber Bragg grating 110 is designed to operate in the aforedescribed regime (B), wherein the grating has a split-type response, so to direct substantial portions of the out-coupled light in two different directions $120_{1,2}$ about the optical axis 150, and wherein the azimuthal angle there-between changes when the wavelength $\lambda$ changes. To ensure that the grating 110 provides the split-type azimuthal distribution of the out-coupled light in the target wavelength range, the grating period $\Lambda$ has to be selected so that the Bragg wavelength $\lambda_{Bragg}$ is outside of the target wavelength range, and the wavelength detuning parameter $|K_t/k_t|$ is within one of specified ranges, as described hereinabove. Additionally, both the coupling efficiency of the grating 110, and the wavelength sensitivity of the azimuthal separation angle $\Delta\phi$ depends on the grating and fiber parameters a, u and $\xi$, which enables their optimization for enhance the device performance. Detailed general guidelines in selecting the grating and fiber parameters based on the analysis of equation (3) are given in the article "Shaping the radiation field of tilted fiber Bragg gratings," J. Opt. Soc. Am. B, 22 (5), pp. 962-974, 2005, which is included herein by reference.

Figure 9:
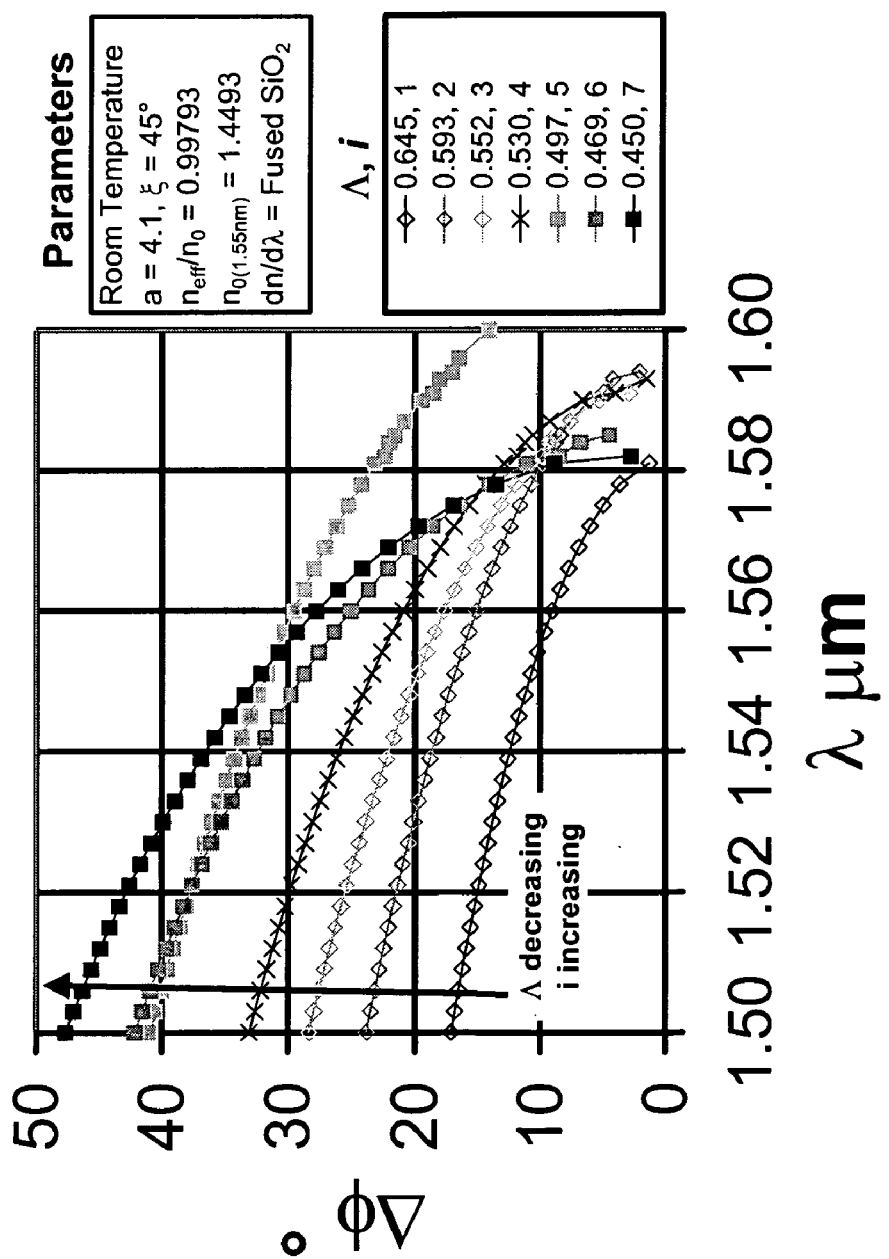
FIG. 9 is a graph showing approximate simulated wavelength dependence of the angular separation between maxima of the two nearest side-lobes in the azimuthal distribution of the out-coupled light for various grating periods providing the split-type grating response.
Figure 10A:
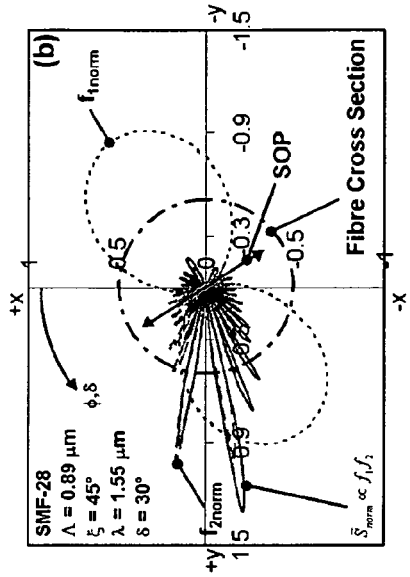
FIGS. 10A-D are diagrams illustrating effect of incident light polarization on the azimuthal distribution of the out-coupled light for the split-type spatial grating response in dependence on the polarization orientation.
Figure 10B:
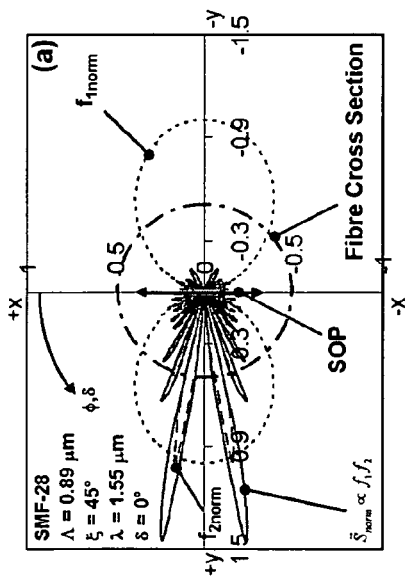
Figure 10C:
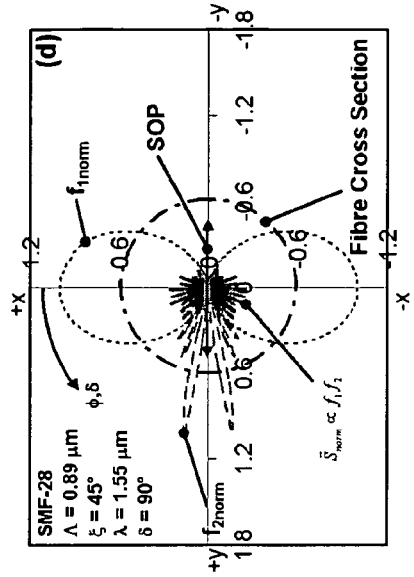
Figure 10D:
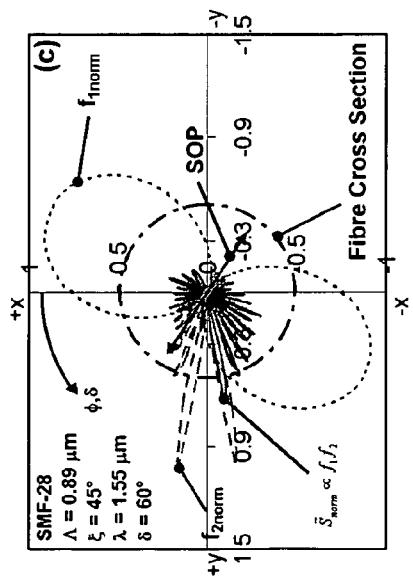

By way of example, FIG. 9 shows a set of simulated plots summarizing the dependence of the azimuthal peak separation angle $\Delta\phi$ on the wavelength $\lambda$ for a set of tilted Bragg grating 110 having differing periods $\Lambda$, each said period selected so to provide the split-type azimuthal response in a target wavelength range between 1.50 μm and 1.58 μm at successively stronger wavelength detuning, as indicated by the successively increasing values of the counter i. These or similar plots, after an experimental verification and, if required, suitable adjustments of the period values for the target wavelength range, can be used for selecting the period of the Bragg grating 110, and to form a look-up table to be stored in the processor 140 memory.

Note, that in the description given hereinabove with reference to FIGS. 6-9, the polarization effects were not considered, as the incident light guided by the fiber 100 was assumed to be non-polarized. If the guided light incident upon the Bragg grating 110 is instead linearly polarized, the grating azimuthal response $S(\phi)$ is modified by the additional dipole-like factor $f_1(\phi-\delta)$. For the split-type two-lobe and three-lobe response, as shown, e.g. in FIGS. 7 and 8, this leads to a different polarization dependence of the portions of the light tapped from the fiber 110 in different azimuthal directions corresponding to different peaks in the grating azimuthal response $S(\phi)$. The polarization dependence of the split-type response is illustrated in FIGS. 10A-D, showing the functions $f_1(\phi)$, $f_2(\phi)$ and their product $f1(\phi) f2(\phi)$, which defines the azimuthal distribution of the out-coupled light $S(\phi)$, for different polarization (SOP) directions of the out-coupled light. As shown in this figure, the polarization dependence of the peak magnitude may lead to substantial asymmetry in the azimuthal distribution of the out-coupled light, and even to an almost complete disappearance of one of the peaks, but not both of them simultaneously. Therefore, in one embodiment the processor 140 is programmed to determine the wavelength $\lambda$ from a position of one intensity maximum along the photo-detector array 130, which corresponds to a lobe of the split response momentarily least affected by the polarization of the guided light and therefore having largest intensity, and by comparing this position to the calibration data.

In other embodiments, the processor 140 is programmed to associate each pixel, i.e. each photo-detecting element, of the detector array 130 with a certain wavelength, and determine the presence of that wavelength from an amount of power detected by the pixel, or attributed to it by a data processing algorithm used e.g. to reduce noise. In one embodiment, the processor 140 is further programmed to associate the wavelength with two non-adjacent pixels, or non-adjacent groups of pixels of the photo-detector array 130, e.g. symmetrically located in the photodetector array 130 about the optical axis 150 preferably at a substantially equal distance therefrom, each to receive a different light portion of the two light portions $120_1$, $120_2$ of the split-type grating response shown in FIG. 4B. In this embodiment, the photo-detector array 130 is effectively divided in two separate sections, each sensitive to one of the two azimuthally directed beams $120_1$, $120_2$, ensuring that at least one of the beams $120_1$, $120_2$ will be detected irrespectively of the incident light polarization. The relative power difference detected between the two pixels associated with the same wavelength can be used for the determination of the state of polarization of the incident light. Signals from either of the two pixels, as well as their combination to increase signal to noise ratio, can be used to detect the presence of the wavelength of light.

Accordingly, the present invention provides a method of determining a wavelength of light propagating in a an optical fiber 100, comprising the steps of:

i) providing a tilted Bragg grating 110 in the fiber 100 for coupling at least a portion of the light out of the fiber to form out-coupled light, wherein the tilted Bragg grating 110 in the waveguide is characterized by the Bragg wavelength $\lambda_{Bragg}$ substantially different from the wavelength $\lambda$ of the light, and has the period $\Lambda$ selected so as to direct a substantial portion of the out-coupled light in a direction which rotates about an optical axis of the waveguide by a substantially non-zero azimuthal angle when the wavelength of the light changes;

ii) determining a value of the azimuthal angle using photo-detecting means sensitive to the azimuthal angle of the out-coupled light; and, iii) determining a value of the wavelength from the value of the azimuthal angle using pre-determined calibration data.

Figure 4D:
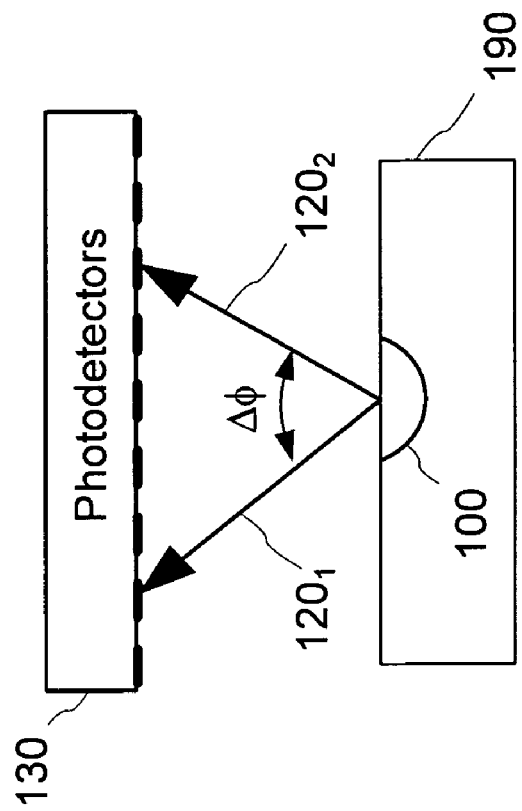
FIG. 4D is a schematic diagram showing a front view of a planar embodiment of the Bragg grating device shown in FIGS. 4A-C.
Figure 4C:
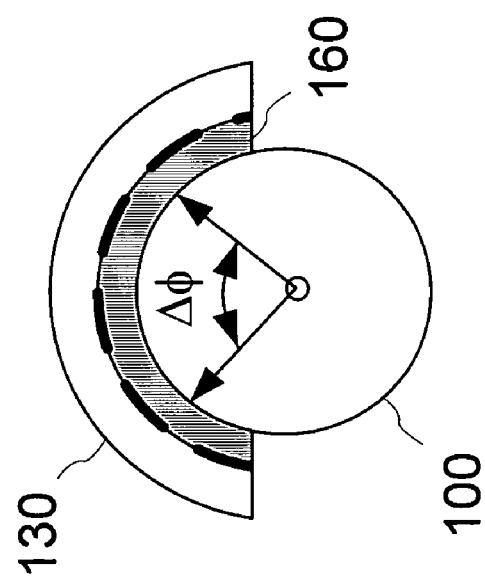
FIG. 4C is a schematic diagram showing a front view of the Bragg grating device having a circumferential photo-diode array.

Of course numerous other embodiments of the device and method of the present invention may be envisioned without departing from the spirit and scope of the invention. For example, the differing polarization sensitivity of the portions of light directed along the different lobes of the split-type grating response enables one to provide an embodiment of the device with the functionality of a wavelength-sensitive polarimeter, wherein the processor 140 is programmed for determining polarization characteristics of the incident light from relative magnitudes of the portions of light as detected by the photo-detector 130, and wherein more than one tilted Bragg grating can be used. In other embodiments, other types of optical waveguides can be used in place of the optical fiber 100, provided that a suitable tilted Bragg grating can be formed therein. One such embodiment is shown in FIG. 4D, wherein the optical waveguide 100 is formed in a planar substrate 190 of a suitable optical material, e.g. silica.

The invention claimed is:

1. A device for measuring a characteristic of light within an operating wavelength range, the device comprising:
   a waveguide for supporting the light propagating therein, the light having a wavelength within the operating wavelength range, the waveguide having an optical axis;
   a Bragg grating formed in the waveguide for coupling at least a portion of the light out of the waveguide through a side surface thereof, and for dispersing thereby formed out-coupled light azimuthally about the optical axis;
   photo-detecting means disposed for detecting an azimuthal distribution of the out-coupled light about the optical axis;
   wherein the Bragg grating has a period selected for providing a maximum out-coupling efficiency at a Bragg wavelength located outside of the operating wavelength range, and so that the azimuthal distribution of the out-coupled light is substantially wavelength dependent and changes when the wavelength is changed within the operating wavelength range; and,
   processing means for receiving information from the photo-detecting means and for determining the wavelength from the detected azimuthal distribution of the out-coupled light that was coupled out of the waveguide by the Bragg grating.

2. A device according to claim 1, wherein the Bragg grating is tilted relative to the optical axis.

3. A device according to claim 1, wherein the photo-detecting means comprises a photodetector array disposed transverse to the optical axis.

4. A device according to claim 3, wherein the photodetector array comprises two different photo detecting elements disposed at a substantially equal distance from the optical axis.

5. A device according to claim 1, wherein the Bragg grating has a period selected for directing a substantial portion of the light coupled out of the waveguide in a direction characterized by an azimuthal tap angle in a plane normal to the optical axis of the waveguide, wherein said azimuthal tap angle changes when the wavelength changes within the operating wavelength range.

6. A device according to claim 5, wherein the processing means is programmed for determining a wavelength value from the azimuthal tap angle of the light received by the photo-detecting means.

7. A device according to claim 5, wherein the Bragg grating is for directing substantial portions of the light coupled out of the waveguide in at least two different directions about the optical axis, wherein each of said two different directions is characterized by a variable azimuthal angle which changes when the wavelength changes.

8. A device according to claim 7, wherein the processing means are programmed for:
   a) determining a wavelength value from at least one of the variable azimuthal angles of the light coupled out of the waveguide, and
   b) determining a polarization characteristic of the light from relative magnitudes of said portions of the light.

9. A device according to claim 1, wherein the waveguide is an optical fiber.

10. A device according to claim 9, wherein the optical fiber is single-mode.

11. A device according to claim 9, wherein the optical fiber is multi-mode.

12. A device according to claim 9, wherein the photo-detecting means comprises a photo-detector array disposed circumferentially about at least a portion of the optical fiber circumference.

13. A device according to claim 1, wherein the waveguide is a planar single-mode optical waveguide.

14. A device according to claim 1, wherein the waveguide is a planar mutli-mode optical waveguide.

15. A device according to claim 1, wherein the processing means comprises a microprocessor suitably programmed for determining the wavelength from the detected azimuthal distribution of light.

16. A device according to claim 1, wherein the processing means comprises a Field Programmable Gate Array device (FPGA) suitably programmed for determining the wavelength from the detected azimuthal distribution of light.

17. A device according to claim 1, wherein the processing means comprises a memory device for storing calibration data.

18. A device according to claim 17, wherein the calibration data comprises a look-up table relating an azimuthal tap angle to a wavelength.

19. A method of determining a wavelength of light propagating in a waveguide, comprising the steps of:
   providing a tilted Bragg grating in the waveguide for coupling at least a portion of the light out of the waveguide to form out-coupled light, wherein the tilted Bragg grating in the waveguide is characterized by a Bragg wavelength substantially different from the wavelength of the light, and has at least a period selected so as to direct a substantial portion of the out-coupled light in a direction which rotates about an optical axis of the waveguide by a substantially non-zero azimuthal angle when the wavelength of the light changes;
   determining a value of the azimuthal angle using photo-detecting means sensitive to the azimuthal angle of the out-coupled light; and,
   determining a value of the wavelength from the value of the azimuthal angle using pre-determined calibration data.

* * * * *